(12) United States Patent
Reuschel

(10) Patent No.: US 7,121,390 B2
(45) Date of Patent: Oct. 17, 2006

(54) METHOD AND APPARATUS FOR ADAPTING A CLUTCH TORQUE

(75) Inventor: Michael Reuschel, Ottersweier (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/778,931

(22) Filed: Feb. 13, 2004

(65) Prior Publication Data

US 2005/0056513 A1    Mar. 17, 2005

(30) Foreign Application Priority Data

Feb. 20, 2003    (DE) ................................ 103 07 037

(51) Int. Cl.
*B60W 10/02* (2006.01)

(52) U.S. Cl. .................... 192/3.58; 701/58; 701/68

(58) Field of Classification Search .......... 192/3.63, 192/3.58; 701/51, 58, 68; 477/39, 44, 86, 477/180

See application file for complete search history.

(56) References Cited

U.S. PATENT DOCUMENTS

| | | | | |
|---|---|---|---|---|
| 5,062,050 A | * | 10/1991 | Petzold et al. | ............. 192/3.58 |
| 5,064,036 A | * | 11/1991 | Schneider | ............... 192/103 F |
| 5,672,132 A | * | 9/1997 | Schwab | ................. 192/103 F |
| 6,622,075 B1 | * | 9/2003 | Reuschel et al. | ............. 701/51 |
| 6,659,253 B1 | * | 12/2003 | Dominke et al. | ........... 477/180 |

* cited by examiner

*Primary Examiner*—Rodney H. Bonck
(74) *Attorney, Agent, or Firm*—Alfred J. Mangels

(57) ABSTRACT

Method for adapting a relationship stored in an electronic control unit, between a moment transmittable by a clutch, and a control variable for controlling an actuation unit of the clutch, which clutch is arranged in an automated motor vehicle drive train with a torque detection device arranged between the clutch and a transmission with a steplessly changeable transmission ratio for producing an output parameter dependent upon a detected moment and the momentary transmission ration of the transmission, by which method the moment transmitted by the clutch is calculated from the momentary transmission ratio and the value of the output parameter, and in an operating condition of the clutch in which the transmittable and transmitted moment of the clutch are equalized, the transmitted moment is coordinated with the control variable as an updated transmittable moment.

10 Claims, 1 Drawing Sheet

METHOD AND APPARATUS FOR ADAPTING A CLUTCH TORQUE

BACKGROUND OF THE INVENTION

1. Field of the Invention

The invention relates to a method and to an apparatus for adjusting a relationship, which has been stored in an electronic control unit, between a torque transmittable by a clutch, and a control variable for controlling an actuation unit of the clutch. The clutch is contained in an automated motor vehicle drive train including a torque detection device arranged between the clutch and a transmission having a steplessly variable transmission ratio, to produce an output parameter from which the torque transmitted by the clutch can be calculated.

2. Description of the Related Art

Automated motor vehicle drive trains, especially those with a steplessly variable transmission, for example a belt-driven conical pulley transmission, are gaining increasing interest because of the possible gain in comfort and the reduced fuel consumption that is attainable.

SUMMARY OF THE INVENTION

A method for adjusting a relationship, stored in an electronic control unit, between a torque transmittable by a clutch, and a control variable for controlling an actuation unit of the clutch. The clutch is arranged in an automated motor vehicle drive train including a torque detection device positioned between the clutch and a transmission having a steplessly changeable transmission ratio. The method includes producing in the torque detection device an output parameter dependent upon a detected torque and a momentary transmission ratio of the transmission. The, torque transmitted by the clutch is calculated from the momentary transmission ratio and the value of the output parameter, and the transmittable torque is adjusted based upon the control variable and the transmitted torque to produce an adjusted transmittable torque at an operating condition of the clutch at which the transmittable and transmitted torque of the clutch are equalized.

DESCRIPTION OF THE PREFERRED EMBODIMENTS

Figure 1:
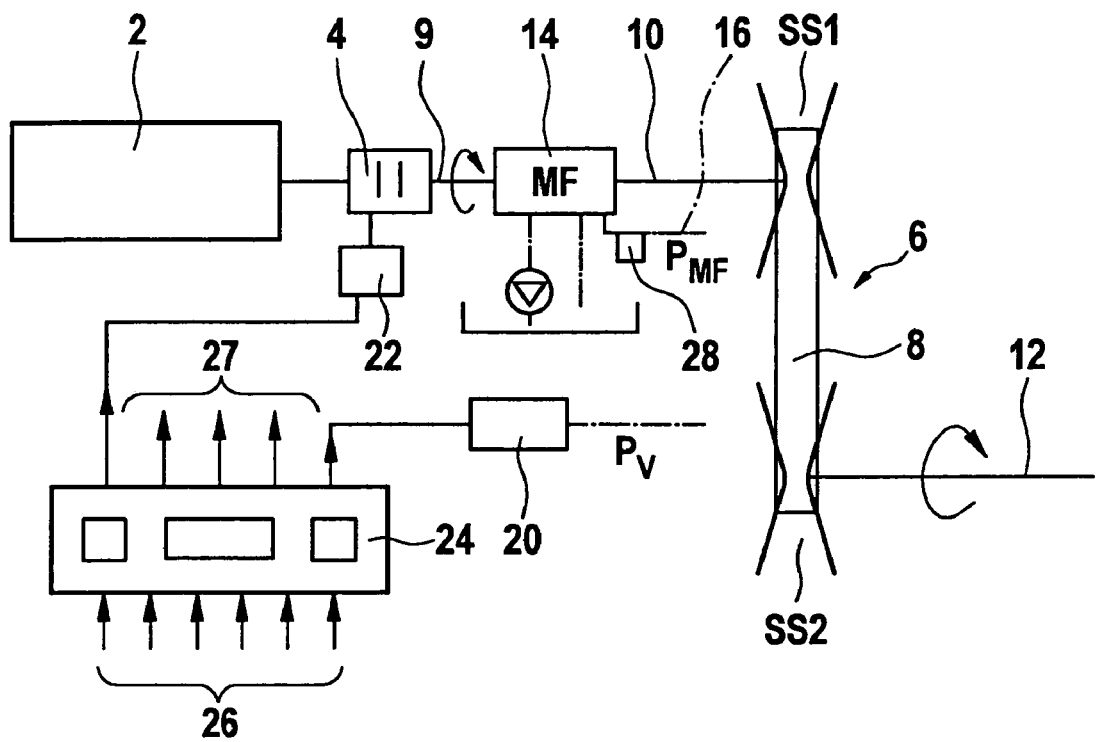
FIG. 1 shows a block circuit diagram of an embodiment of one such drive train in accordance with the present invention.

An internal combustion engine 2 is connected with a first pulley set SS1 of a belt-driven conical pulley transmission 6 through a clutch 4. An endless torque-transmitting means 8 runs between the first pulley set SS1 and a second pulley set SS2 of the belt-driven conical pulley transmission. Through opposite changes in the spacing between the conical pulleys of each conical pulley pair, the transmission ratio between an input shaft 10 and an output shaft 12 of the belt-driven conical pulley transmission 6 is established by the endless torque-transmitting means 8. A torque detection device 14 is arranged between the clutch 4 and the pulley pair SS1 that detects the torque that is transmitted by the clutch 4 and produces a hydraulic pressure $p_{MF}$ in a hydraulic output conduit 16, from which the torque that is operative at the clutch output shaft 9 is dependent.

Such a torque detection device 14 is described in, for example, the conference proceedings of the sixth LuK colloquium, 1998, pages 161 through 174, "Requirements for the Contact Pressure System," and contains a component that is non-rotatably connected with the output shaft 9 of the clutch 4, and a component that is non-rotatably connected with the transmission input shaft 10. The components are constructed in such a way with profiled surfaces and roller elements arranged between them, that by an increase in torque the spacing between the profiled surfaces or components changes and thereby the size of an outflow opening to which pressure medium pressure is applied changes, so that an increasing pressure $p_{MF}$ prevails in the hydraulic output conduit 16 that branches off from the flow upstream of the outflow opening with increasing torque transmitted by the clutch 4.

This pressure $p_{MF}$ is conducted directly to the pulley pairs SS1 and SS2, so that it produces a torque-dependent contact force with which the pairs of conical pulleys contact the endless torque-transmitting means 8.

To adjust the belt-driven conical pulley transmission, an adjustment device 20 is provided that additionally applies an adjustment pressure $p_v$ in such a way that the transmission ratio of the transmission is adjusted.

An actuation unit 22, which for example operates hydraulically, is provided in order to actuate the clutch 4.

To control the described system, an electronic control unit 24 with a microprocessor and associated memories is provided, whose inputs 26 are connected with sensors for detecting relevant operating parameters of the drive train, such as the engine rotational speed, the position of a load actuator, the position of an accelerator pedal, the rotational speeds of the different shafts, and by means of a sensor 28 the pressure $p_{MF}$. Control unit outputs 27 control different actuators, such as the adjustment device 20, the clutch actuation unit 22, a load actuator of the internal combustion engine, and the like.

An advantage that is achieved with the torque detection device 14 and the torque-dependent pressure $p_{MF}$ produced by it lies in that the contact force between the conical disks and the endless torque-transmitting means is in agreement with the corresponding instantaneous torque provided at the output shaft of the clutch, and thereby avoids an overpressure that is present in systems with an electronic contact pressure as a result of uncertainties in the torque detection.

With a given coefficient of friction between the surfaces of the conical disks and the endless torque-transmitting means, the minimum contact force F that is required to prevent slippage increases approximately linearly with the torque T, whereby the contact force required increases with increasing transmission ratio (underdrive). For safety reasons, for example, the actual contact force must be somewhat greater than the minimum contact force in order to compensate for fluctuations in the coefficient of friction, in order that slippage may be prevented with certainty. On the other hand, the contact force should not be unnecessarily large, so that unnecessarily large forces that would lead to wear and power consumption by the hydraulic system are avoided.

With a torque detection device 14 that delivers a pressure $p_{MF}$ proportional to the torque and thereby also a contact pressure proportional to the torque, contact forces are reached that are unnecessarily large only at decreasing transmission ratio $i_{var}$.

Figure 2:
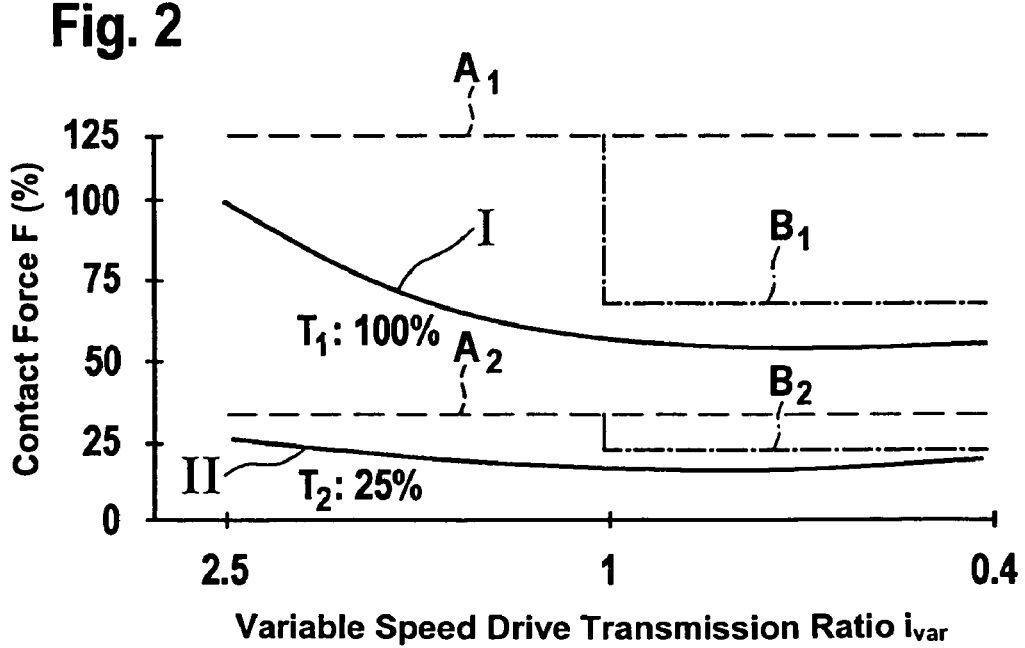
FIG. 2 is a graph of contact force as a function of transmission ratio for a conical pulley transmission.

In FIG. 2 that is made clear.

Curve I indicates the required minimum contact force at the maximum permissible torque $T_1$. As can be seen, that minimum contact force declines with decreasing transmission ratio $i_{var}$ of the transmission system 6 (conversion from underdrive to overdrive). A torque detection device 14, whose output pressure $p_{MF}$ is a function only of the torque, must be designed in such a way that the contact force F produced by the pressure $p_{MF}$ at the highest permissible torque $T_1$ is 25% above the required minimum contact force in the case of the highest possible transmission ratio for the transmission (approximately 2.5 in the example). Since $p_{MF}$ is not a function of the transmission ratio $i_{var}$, a horizontal line $A_1$ results for $p_{MF}$, which shows $p_{MF}$ as a function of $i_{var}$.

Curves II and $A_2$ show the analogous relationships for a torque $T_2$ that corresponds to 25% of the maximum permissible torque.

In order that the contact force, which is increasingly unnecessarily high at decreasing transmission ratios $i_{var}$, can be better adapted to the actual requirement, it is known to construct the torque detection device as two stages, that is, to switch the proportionality constant, with which the pressure $p_{MF}$ depends upon the torque, for example at the transmission ratio $i_{var}=1$, so that a weaker contact pressure results and therewith also a lower contact force $B_1$. In that way, the hydraulic system can be operated with smaller forces and correspondingly lower energy consumption.

The switch in the dependence of the pressure $p_{MF}$ on the torque that occurs at a defined transmission ratio $i_{var}$ takes place, for example, as a result of the size of a surface within the torque detection device that is impacted with a pressure that is abruptly increased at a defined position of the displaceable pulley of the pulley set SS1 (in the illustrated example in the position that corresponds to a transmission ratio of 1).

A further important prerequisite for a problem-free and comfortable operation of the described drive train lies in the precise control of the clutch 4. Especially when starting, and also when shifting, the clutch must be controllable in such a way to allow jerk-free operation, and also to allow operation that is adequately "thrilling" for sporty driving, so that the transmittable torque corresponds precisely with a target torque that is a function of the drive parameters of the drive train. For that purpose, a characteristic curve, for example, is stored in the control device 24, that for every value of a control variable conducted to the actuation unit 22, for example an electrical current or an electrical voltage, a target value of the torque transmittable by the clutch 4 is associated.

On the basis of wear or the change in other parameters, the actual torque value, which arises when controlling the actuation unit 22 by a control variable that corresponds to the target value, can change, or the wear or the changes at the clutch 4 can cause a difference between the target torque and the actually existing clutch torque, so that the clutch torque, or the relationship between the control variable and the clutch torque must be adjusted or updated. That takes place as described in, for example, DE 19 951 946 A1, in a way that the actual torque $T_I$, momentarily transmitted by the clutch 4, is calculated from the pressure $p_{MF}$ at the outlet of the torque detection device 14 in accordance with the following relationship:

$$T_I = c \times p_{MF}$$

wherein c is a parameter that in the case of single-stage torque detection devices has a constant value over the entire transmission ratio range of the transmission, and in a two-stage construction of the torque detection device has two values, between which switching takes place at a predetermined transmission ratio. Because the parameter c is constant over large transmission ratio ranges for a single-stage torque detection device, and also for a two-stage torque detection device, knowledge of the exact transmission ratio is not necessary for that adjustment method. One must merely ensure that the transmission ratio lies within defined ranges.

An adjustment of the clutch torque can take place in a simple way in that the torque actually transmitted by the clutch 4 is calculated from the above-mentioned relationship in the control device 24 on the basis of the pressure $p_{MF}$, which is detected by the sensor 28 and forwarded to the control device and is compared with the target torque of the clutch that is stored in the control device 24, and the actuation unit 22 is correspondingly controlled. If the momentary transmitted torque $T_I$ that is constantly detected by the torque detection device 14 and the target torque $T_S$ that has been set by the actuation unit 22 vary, the relationship between the control variable and the target torque is adjusted in such a way that agreement or convergence of the two torques is provided. It is to be understood that one such adjustment is possible only at certain operating conditions, for example at such conditions at which the clutch 4 slips, since only then does the torque transmittable by the clutch, which is controlled by the actuation unit 22, correspond to the actually transmitted torque that is detected by the torque detection device 14.

Further developed torque detection devices, for example continuous, hydraulic, stepless torque sensors, are constructed in such a way that the parameter c, which indicates the dependence of the momentarily transmitted torque $T_I$, and the pressure $p_{MF}$, changes quasi continuously with the transmission ratio $i_{var}$, so that the step curve AB in accordance with FIG. 2 changes over into a curve which, based on the contact force, lies approximately 25% (the safety margin) beyond the respective required minimum contact force curve. An adjustment of the clutch torque is no longer possible in a simple manner in such a stepless form of the torque detection device, since the relationship $T_I = c \times p_{MF}$, with c=constant or quasi constant, is no longer valid over wide transmission ratio ranges (2-stage torque sensor), or then the permanent transmission ratio dependence has to be taken into account. Because one construction-related feature in the previous adjustment of the clutch torque was that the motor vehicle be at a standstill, the transmission ratio of the variable speed unit is not known at a transmission ratio determination from wheel rotational speeds; consequently the transmission-ratio-dependent proportionality constants cannot be calculated. On that basis, in an advantageous way a geometrically unambiguous transmission ratio is set before and during the adjustment in the method represented, so that in that case the proportionality constant can be calculated from the not calculable, but nevertheless geometrically existing, transmission ratio.

The invention is based on the object to provide a method and an apparatus for adjusting the clutch torque, by which an adjustment is possible with a torque detection device, with a stepless change of the correlation between the detected torque and the pressure $p_{MF}$ that is produced.

That object is achieved with a method for adjusting a relationship, which has been stored in an electronic control unit, between a torque transmittable by a clutch and a control variable for controlling an actuation unit of the clutch. The clutch is arranged in an automated motor vehicle drive train with a torque detection device that is positioned between the clutch and a transmission having a steplessly variable transmission ratio, to produce an output parameter that is dependent upon the detected torque and the momentary transmission ratio of the transmission. In the inventive method the torque transmitted by the clutch is calculated from the momentary transmission ratio of the transmission and the value of the output parameter of the torque detection device, and, in an actuation condition of the clutch at which the transmittable and the transmitted torques of the clutch are equal, the transmitted torque is associated with the control variable in the form of an updated or adjusted transmittable torque.

The method in accordance with the invention starts with a relationship $T_T = c(i_{var}) \times p_{MF}$, wherein the parameter c is a function of the transmission ratio of the transmission. For example, in the sense of the relationship illustrated in FIG. 2 c increases in such a way with decreasing transmission ratio $i_{var}$ of the transmission, or the variable speed unit, that a good match with the required minimum contact pressure with a sufficient safety margin of, for example, 25% is possible.

With the inventive method the momentary transmission ratio of the transmission is known for the adjustment, and therethrough the momentary torque transmitted by the clutch can be calculated from the output parameter of the torque detection device, for example an electric current, a hydraulic pressure, or another physical parameter on the basis of the relationship $T_T = c(i_{var}) \times p_{MF}$ (wherein $p_{MF}$ stands for the output parameter). If the clutch 4 is thereby in a condition in which the torque transmitted by it clearly depends on the control variable, for example an electrical current, that has been delivered by the actuation unit 22, or is brought into such a condition, for example a slippage condition, by a change in the electrical current, the value of the target torque $T_S$ to be set is compared with the detected actual torque $T_I$, and by a deviation, an appropriate correction, −t, of the parameters stored in the control device 24 is carried out, so that the relationship between the control variable and the target torque is adjusted. Whether the clutch is in a slippage condition can thereby be determined, for example, that at a constant position of its load actuator the engine reacts with a rotational speed change at a change in the control variable that is delivered to the actuation unit 22. The slippage condition of the clutch can also be calculated on the basis of the rotational speed difference between an engine output shaft and a clutch output shaft, wherein the necessary sensors for detecting the respective rotational speeds are provided as a general rule in stepless transmissions.

Naturally, the above-described adjustment is not possible at all operating conditions of the drive train, for example not if driving is to be undertaken at the maximum possible torque, since the clutch cannot then be disengaged.

It is advantageous if the transmission ratio of the transmission in which an adjustment takes place is the highest possible transmission ratio of the transmission, because that highest possible transmission ratio represents a known parameter within the sense of the control device 24. The transmission adjusts to the highest possible transmission ratio at different conditions, for example after moderate braking of the motor vehicle to an approximate standstill, or generally in slow braking processes at low speed. For a transmission ratio regulation, it is necessary to know the respective limiting transmission ratios in underdrive and overdrive. Those quantities can be ascertained by appropriate learning processes. On that basis, the highest possible transmission ratio of the transmission (UD-stop) can be assumed to be known, so that that condition of the transmission can be recognized with certainty.

It is advantageous to carry out an adjustment when the transmission is in the condition of its highest possible transmission ratio, when the motor vehicle is at a standstill or creeping.

The transmission with a stepless adjustment of the transmission ratio can have the most varied structure, for example a friction wheel drive. When the transmission is a belt-driven conical pulley transmission, it is advantageous to ensure the shortest possible transmission ratio, whereby an increased pressure for pressing on the endless torque-transmitting means is applied to the output side pair of conical disks (SS2) before the beginning of and during the adjustment. Thereby it can be ensured that the transmission does not leave the condition of its highest possible transmission ratio.

A further possibility to ensure that the transmission is in its highest possible transmission ratio condition lies in the fact that before and during the adjustment to activate in a transmission control unit a transmission ratio target value that corresponds with a higher transmission ratio than the highest possible transmission ratio. Therewith it is achieved that before the adjustment the transmission is reliably adjusted to its end stop, and during adjustment it remains in that end stop.

An additional possibility for ensuring that the transmission is in its condition of the highest possible transmission ratio during adjustment lies in the activation of an increased transmission input target rotational speed before and during the adjustment, so that in the sense of a transmission ratio adjustment device the transmission is adjusted to the highest possible transmission ratio range and is held there.

If the output signal of the torque detection device is the pressure of a hydraulic medium (as in the described example), a monitoring device is advantageously present by means of which an adjustment is preventable in the event of an influence, which is not dependent upon the torque, on the pressure of the hydraulic medium. The monitoring device is advantageously contained in the control device 24, and it can additionally contain a correction device with which a correction is carried out on the portion of the pressure of the hydraulic medium that is not dependent on the torque, so that a correct adjustment is possible.

The above-described implementation form of the inventive method is advantageous since the pressure $p_{MF}$ of the hydraulic medium at the outlet of the torque detection device can be influenced in certain operating conditions by a backpressure, which arises in the hydraulic system components that are found downstream of the torque detection device. A mathematical model of the backpressure can be implemented in the control device 24, so that account can be taken of the backpressure in the calculation, from the pressure $p_{MF}$, of the transmitted torque. The calculation of the actual torque $T_1$ from the pressure $p_{MF}$ is only then permissible when the pressure $p_{MF}$ is not determined by the backpressure.

An adjustment in the case in which the transmission ratio of the transmission differs from the highest possible transmission ratio advantageously takes place only if that can be currently calculated.

If the output parameter is an hydraulic medium pressure, an adjustment in the case in which the transmission ratio of the transmission differs from the highest possible transmission ratio advantageously only takes place if a value of the hydraulic medium pressure, which is measured at a widely disengaged clutch, lies below the value that is measured on a clutch that is adjusted to a target clutch torque. Therethrough, it can be ensured that an adjustment only takes place if no or only a little influence of the backpressure is present on the pressure PMF that is taken into account for the calculation.

An apparatus that solves the part relating to the object of the invention for adjusting the transmittable torque of a clutch in an automated motor vehicle drive train with a drive motor, which is connected through the clutch with a transmission having a steplessly variable transmission ratio, and a torque detection device for detecting the input torque of the transmission, which torque detection device produces an output value which is dependent upon the torque and the transmission ratio of the transmission, and including an electronic control unit for controlling a clutch actuation unit, in which control unit a characteristic curve is stored which gives a target torque transmittable by the clutch as a function of the control variable, which control unit is constructed for adjusting the characteristic curve in accordance with one of the above-described methods.

The invention can be used for the most widely differing kinds of torque detection devices and transmissions having a continuously adjustable transmission ratio.

The invention claimed is:

1. A method for adjusting a relationship, stored in an electronic control unit, between a torque transmittable by a clutch, and a control variable for controlling an actuation unit of the clutch, which clutch is arranged in an automated motor vehicle drive train between a drive motor and a transmission, the drive train including a torque detection device arranged between the clutch and a transmission having a steplessly changeable transmission ratio, said method comprising the steps of: producing in the torque detection device an output parameter dependent upon a detected torque and a momentary transmission ratio of the transmission, calculating the torque transmitted by the clutch from the momentary transmission ratio and the value of the output parameter, and adjusting the transmittable torque based upon the control variable and the transmitted torque to produce an adjusted transmittable torque at an operating condition of the clutch at which the transmittable and transmitted torques of the clutch are equalized.

2. A method in accordance with claim 1, whereby the transmission ratio at which an adjustment takes place is the highest possible transmission ratio of the transmission.

3. A method in accordance with claim 2, whereby an adjustment takes place when the motor vehicle is at a standstill or is creeping.

4. A method in accordance with claim 2, whereby the transmission is a belt-driven conical pulley transmission having input and output side conical disk pairs and including an endless torque-transmitting means, whose output side conical disk pair before beginning and during adaptation adaptation adjustment is acted upon with a higher pressure for pressing against the endless torque-transmitting means.

5. A method in accordance with claim 2, including the step of: activating in a transmission control unit a target transmission ratio value that corresponds to a higher transmission ratio than the highest possible transmission ratio before beginning and during the adjustment.

6. A method in accordance with claim 2, including the step of: activating an increased transmission input target rotational speed in a transmission control unit before beginning and during the adjustment.

7. A method in accordance with claim 1, whereby the output parameter is an hydraulic medium pressure, and the method includes the step of providing a monitoring device by means of which an adjustment is preventable by an influence on the pressure of the hydraulic medium that is not dependent upon the torque.

8. A method in accordance with claim 1 wherein when the transmission ratio of the transmission is different from the highest possible transmission ratio, an adjustment takes place only if it can actively be calculated.

9. A method in accordance with claim 1, whereby the output parameter is an hydraulic medium pressure, and when the transmission ratio of the transmission is different from the highest possible transmission ratio, an adjustment takes place only if a measured value of the output parameter with a fully disengaged clutch lies below a value that is measured at the clutch when it is adjusted to a target clutch torque.

10. Apparatus for adjusting the transmittable torque of a clutch in an automated motor vehicle drive train including a drive motor, which is connected through the clutch with a transmission having a steplessly variable transmission ratio, said apparatus comprising: a torque detection device for detecting an input torque of the transmission, which torque detection device produces an output parameter which is dependent upon the torque and the transmission ratio of the transmission, and an electronic control unit for controlling a clutch actuation unit with a control value, in which control unit a characteristic curve is stored which gives a target torque transmittable by the clutch as a function of a control variable, which control unit is constructed for adjusting the characteristic curve as a function of the output parameter.

* * * * *